(12) United States Patent
Schuler et al.

(10) Patent No.: US 10,661,787 B2
(45) Date of Patent: May 26, 2020

(54) ARRANGEMENT AND A PROCESS FOR CONTROLLING A PARK AREA ACCESS SYSTEM

(71) Applicant: VALEO COMFORT AND DRIVING ASSISTANCE, Créteil (FR)

(72) Inventors: Stephane Schuler, Shenzhen (CN); Joel Motz, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 16/012,281

(22) Filed: Jun. 19, 2018

(65) Prior Publication Data

US 2018/0362027 A1    Dec. 20, 2018

(30) Foreign Application Priority Data

Jun. 19, 2017    (CN) .......................... 2017 1 0462719

(51) Int. Cl.
| | |
|---|---|
| *B60W 30/06* | (2006.01) |
| *G05D 1/00* | (2006.01) |
| *G07C 9/00* | (2020.01) |
| *B60R 25/01* | (2013.01) |
| *E05F 15/77* | (2015.01) |
| *B60W 50/00* | (2006.01) |

(52) U.S. Cl.
CPC ............. *B60W 30/06* (2013.01); *B60R 25/01* (2013.01); *E05F 15/77* (2015.01); *G05D 1/0016* (2013.01); *G07C 9/00174* (2013.01); *G07C 9/00309* (2013.01); *B60W 2050/0066* (2013.01); *E05Y 2900/106* (2013.01); *G07C 2009/00769* (2013.01); *G07C 2009/00928* (2013.01)

(58) Field of Classification Search
CPC ........ B60W 30/06; B60R 25/01; E05F 15/77; G05D 1/0016; G07C 9/00174; G07C 9/00309

See application file for complete search history.

(56) References Cited

U.S. PATENT DOCUMENTS

| | | | | |
|---|---|---|---|---|
| 6,252,544 B1 * | 6/2001 | Hoffberg | ............ | H04B 7/18576 342/357.31 |
| 6,526,335 B1 * | 2/2003 | Treyz | ..................... | G01C 21/26 701/1 |
| 6,615,132 B1 * | 9/2003 | Nagasaka | ............... | G01C 21/26 340/932.2 |
| 2002/0032510 A1 * | 3/2002 | Turnbull | ................... | B60R 1/12 701/49 |
| 2002/0183008 A1 * | 12/2002 | Menard | .............. | G07C 9/00182 455/66.1 |

(Continued)

*Primary Examiner* — Behrang Badii
*Assistant Examiner* — Daniel L Greene
(74) *Attorney, Agent, or Firm* — Osha Liang LLP

(57) ABSTRACT

An arrangement for controlling a park area access system comprises a button (34) and a first control circuit (30) connected to the button (34) and suited to trigger the operation of the park area access system upon actuation of the button (34). The arrangement also comprises a receiver circuit (46); a controllable switch (44) connected in parallel to the button (34); and a second control circuit (42) suited to toggle the controllable switch (44) when the receiver circuit (46) receives a wireless instruction. A process for controlling a park area access system using such an arrangement is also described.

9 Claims, 1 Drawing Sheet

(56) References Cited

U.S. PATENT DOCUMENTS

| | | | |
|---|---|---|---|
| 2004/0110472 A1* | 6/2004 | Witkowski | G07C 5/008 455/41.2 |
| 2005/0046584 A1* | 3/2005 | Breed | B60C 11/24 340/13.31 |
| 2007/0063875 A1* | 3/2007 | Hoffberg | G08G 1/0104 340/995.1 |
| 2008/0161987 A1* | 7/2008 | Breed | G08G 1/161 701/27 |
| 2009/0003219 A1* | 1/2009 | Beacham | H04L 43/00 370/241 |
| 2009/0109062 A1* | 4/2009 | An | G06Q 20/04 340/932.2 |
| 2011/0131154 A1* | 6/2011 | Faber | G01C 21/32 705/418 |
| 2011/0254675 A1* | 10/2011 | Koehler | B60K 28/066 340/439 |
| 2014/0172727 A1* | 6/2014 | Abhyanker | G06Q 50/30 705/307 |
| 2015/0375741 A1* | 12/2015 | Kiriya | G06K 9/00355 701/2 |
| 2016/0180712 A1* | 6/2016 | Rosen | G08G 1/015 705/5 |
| 2016/0182170 A1* | 6/2016 | Daoura | H04W 4/029 455/3.01 |
| 2017/0285654 A1* | 10/2017 | Nagai | B60W 30/06 |
| 2018/0107207 A1* | 4/2018 | Kim | B60W 30/06 |
| 2018/0329410 A1* | 11/2018 | Schuler | E05F 15/77 |

\* cited by examiner

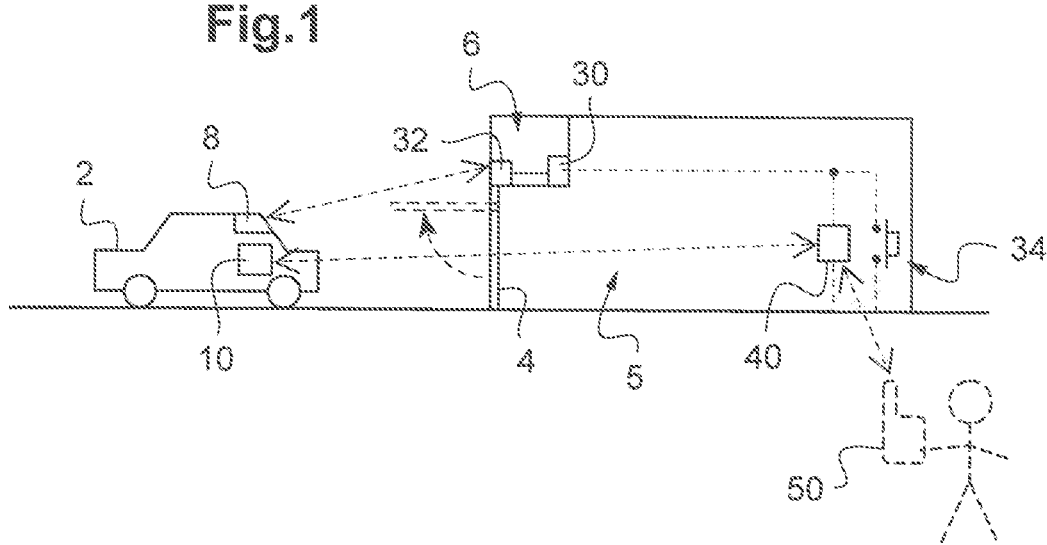
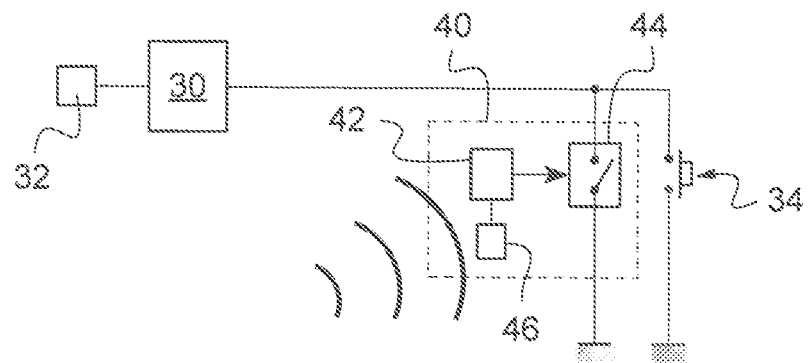
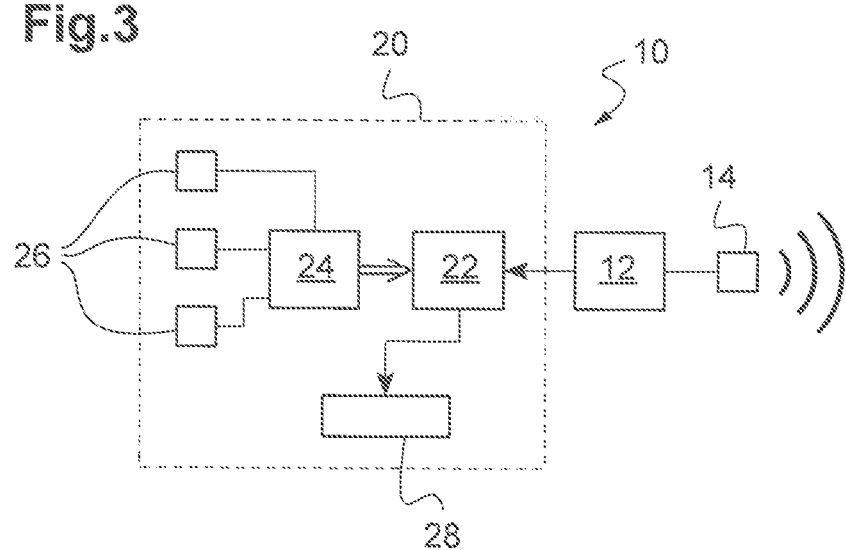

ARRANGEMENT AND A PROCESS FOR CONTROLLING A PARK AREA ACCESS SYSTEM

TECHNICAL HELD OF THE INVENTION

The invention relates to systems for access to a park area. More precisely the invention relates to an arrangement and a process for controlling a park area access system.

BACKGROUND INFORMATION AND PRIOR ART

It is known to provide vehicles with an automatic parking capability such that the vehicle may park without receiving any direction from the driver. Such a vehicle may have for instance an onboard system including an automatic parking unit adapted to control a maneuver of the vehicle in a garage.

Besides, it is known to control an automated garage door using either a button in the garage or a remote control. Such systems are generally known as GDO (for "Garage Door Opener"), the remote control being called a UGDO (for "Universal Garage Door Opener").

The automatic parking unit and the garage door opener are however usually distinct systems that are unable to cooperate.

SUMMARY OF THE INVENTION

In this context, the invention provides an arrangement for controlling a park area access system, comprising a button; a first control circuit connected to the button and suited to trigger the operation of the park area access system upon actuation of the button; characterized by a receiver circuit; a controllable switch connected in parallel to the button; and a second control circuit suited to toggle the controllable switch when the receiver circuit receives a wireless instruction.

Thanks to this arrangement, receipt of the wireless instruction by the receiver circuit can be detected by the second control circuit, which can then toggle the controllable switch to simulate depression of the button. Receipt of the wireless instruction can therefore lead to operation of the park area access system.

For clarity, the access system may be for instance a garage door, a gate, a barrier or a lift, that needs to be operated while maneuvering the car.

In some embodiments, the arrangement may further include a receiver unit connected to the first control circuit and suited to receive a (typically sub GHz) radiofrequency signal; the first control circuit may in this case also be suited to trigger the operation of the park area access system upon this receiver unit receiving the sub GHz radiofrequency signal.

This is the case for instance of an access system controllable by a remote control, such as a conventional UGDO (as mentioned above).

In this situation, provision of the controllable switch toggled upon the receiving of a wireless instruction at the receiver circuit makes it possible to remotely control operation of the access system via a wireless communication technology that is distinct from the conventional sub GHz radiofrequency The wireless communication technology may for instance be Bluetooth or communication in a wireless area network, The button is for instance located in the park area.

The invention also provides a process for controlling a park area access system using an arrangement as defined above, comprising the following steps:

sending the wireless instruction (with valid credentials, in practice) by a communication circuit;

toggling the controllable switch by the second control circuit upon receiving the wireless instruction (as well as valid credentials, in practice) at the receiver circuit.

The following optional (and thus non limiting) features are also proposed:

the communication circuit is suited to establish a wireless data link (such as a Bluetooth data link, or a link in a wireless local area network or WLAN) with the receiver circuit and to transmit said wireless instruction via said wireless data link;

an onboard system of a vehicle comprises the communication circuit and an automatic parking unit suited to control a maneuver of the vehicle in the park area;

the communication circuit is suited to send the wireless instruction synchronously to said maneuver;

the automatic parking unit is suited to compute an appropriate time for operation the access system;

the communication circuit is suited to transmit the wireless instruction at said appropriate time;

the automatic parking unit includes at least one sensor for acquiring data relating to the vehicle environment;

the automatic parking unit includes a processing circuit for processing data acquired by the sensor;

the automatic parking unit includes a control circuit for controlling a vehicle motion control mechanism based on the processed data an electronic device, such as a smartphone, integrates said communication circuit, Other features and advantages of the embodiments of the present invention will be better understood upon reading of preferred embodiments thereof with reference to the appended drawings.

BRIEF DESCRIPTION OF THE DRAWINGS

FIG. 1 shows a possible context of implementation of the invention,

FIG. 2 shows a possible embodiment of an arrangement for controlling a park area access system according to the invention.

FIG. 3 shows a possible embodiment of a vehicle onboard system adapted to cooperate with this arrangement,

DETAILED DESCRIPTION OF EXAMPLE(S)

In the context shown in FIG. 1, a park area 5 (here: a garage) is secured by an access system 4 (here a garage door).

A mechanism 6 for operating the access system 4 (i,e, here for opening or closing the garage door) can be activated either by depressing a button 34 (typically located in the park area 5) or using a remote control 8, such as a Universal Garage Door Opener, that can for instance be mounted in a vehicle 2.

Specifically, a control circuit 30 suited to activate the mechanism 6 is connected to the button 34. In the example described here, the button 34 is interposed between the control circuit 30 and a ground terminal, as shown in FIG. 2. It may however not necessarily be wired that way.

When the user depresses the button 34, an actuation signal is detected at the control circuit 30 (a pin of the control circuit 30 being momentarily set to the ground potential, for instance) and the control circuit 30 then activates the mechanism 6.

Besides, a receiver unit 32 (for instance implemented by a transceiver) is also connected to the control circuit 30 and suited to receive (and possibly transmit) a radiofrequency signal (here: a sub Ghz radiofrequency signal, i.e. a radiofrequency signal having a main frequency below 1 GHz).

The control circuit 30 is suited to also activate the mechanism 6 for operating the access system 4 when the receiver unit 32 receives this radiofrequency signal (together with valid credentials in practice).

As visible in FIGS. 1 and 2, an electronic module 40 is connected to the control unit 30 in parallel to the button 34.

This electronic module 40 may in practice be an add-on that has been mounted by the user in parallel to an existing button 34 in such a way to obtain complementary operational features for the access system 4, as explained below.

The electronic module 40 comprises a control circuit 32 (for instance a microprocessor or a microcontroller), a controllable switch 44 and a receiver circuit, implemented here by a transceiver circuit 46.

The controllable switch 44 is connected in parallel to the button 34; the controllable switch 44 is thus here also interposed between the control circuit 30 and the ground terminal, as visible in FIG. 2.

The transceiver circuit 46 is suited to receive a wireless instruction from an external communication circuit 14. In the embodiment described here, the transceiver circuit 46 and the communication circuit 14 are suited to establish a wireless data link (such as a Bluetooth data link, or a link in a wireless local area network or WLAN) between them. The wireless instruction may then be transmitted from the communication circuit 14 to the transceiver circuit 46 via this wireless data link.

The control circuit 42 is suited to toggle the controllable switch 44 (specifically here to control closing of the controllable switch 44 for a predefined period of time, e.g. in practice by applying a given voltage to a control pin of the controllable switch 44) when the transceiver circuit 46 receives the wireless instruction mentioned above with valid credentials, Thanks to the parallel arrangement of the button 34 and the controllable switch 44, closing the controllable switch 44 simulates depression of the button 34 triggering the control circuit 30 to activate the mechanism 6 and consequently operate the access system 4. Phrased differently, toggling the controllable switch 44 generates a signal identical to the actuation signal transmitted to the control circuit 30 when the button 34 is depressed, such that the control circuit 30 activates the mechanism 6 an consequently operate the access system 4.

Receiving the wireless instruction at the transceiver circuit 46 results in operating the access system 4.

According to a first embodiment presented referring to FIG. 3, the external communication circuit 14 is embedded in an onboard system 10 of the vehicle 2.

This onboard system 10 also integrates an electronic control unit 12 connected to the communication circuit 14 and an automatic parking unit 20.

The automatic parking unit 20 comprises at least one sensor 26 (generally a plurality of sensors), a processing circuit 24, a control circuit 22 and at least a vehicle motion control mechanism 28 (such as a power train and/or a steering system and/or a braking system).

Each sensor 26 (for instance a video camera or an ultrasonic sensor) captures data representative of the environment of the vehicle 8.

The processing circuit 24 processes (e.g. analyzes) the (raw) data captured by the sensor(s) 26 to generate processed data, which also incorporates the vehicle environment, but in a more synthetic manner. The processed data contains for instance the location of detected objects in the environment of the vehicle 8.

The control circuit 22 receives these processed data and a command from the electronic control unit 12.

When the command received from the electronic control unit 12 indicates the automatic maneuver should proceed (for instance further to receiving a corresponding user instruction via a human-machine interface connected to the electronic control unit 12), the control circuit 22 controls the vehicle motion control mechanism(s) 28 based on the processed data so as to drive the vehicle 2 in its environment.

When the command received from the electronic control unit 12 indicates the automatic maneuver should be stopped (for instance when receiving a corresponding order from the user via the human-machine interface), the control circuit 22 controls the vehicle motion control mechanism(s) 28 to halt the vehicle 2, At some point of time during the maneuver, when the automatic parking unit 20 computes that the operation of the access system 4 needs to be started to allow a continuous park maneuver, the electronic control unit 12 sends the wireless instruction to the electronic module 40, here via the wireless data link established between the communication circuit 14 and the transceiver circuit 46, as explained above. (In practice, the automatic parking unit 20 may compute an appropriate time to operate the access system 4 and communicate this appropriate time to the electronic control unit 12, which may then control the communication circuit 14 to transmit the wireless instruction at said appropriate time.) Operation of the access system 4 may thus be controlled synchronously to the vehicle maneuver.

According to a possible variation, the decision to trigger the operation of the access system 4 may be taken asynchronously (relative to the progress of the maneuver), for instance at the start of the maneuver or when the maneuver cannot proceed any longer without operation of the access system 4.

As explained above, upon the transceiver circuit 46 receiving the wireless instruction, the control circuit 42 toggles the controllable switch 44 and the control circuit 30 thus activates the mechanism 6 operates the access system 4 (i.e. here in order to open the garage door) such that, under the control of the automatic parking unit 20, the vehicle 2 may clear the access system 4 and continue the maneuver (here: enter the park area 5).

Use of the electronic module 40 thus makes it possible to wirelessly control the operation of the access system 4 with another means than the remote control 8. This is particularly interesting when the remote control 8 is not designed to cooperate with the automatic parking unit 20. The transceiver unit 46 is chosen so as to be compatible with the communication circuit 14 provided in the vehicle 2, preferably using a common wireless communication standard, such as Bluetooth or a WLAN, as already indicated.

According to a second embodiment, the external communication circuit is included in an electronic device 50, such as a smartphone (as schematically shown in dotted lines in FIG. 1).

In this case, the communication circuit of the electronic device 50 can send the wireless instruction intended to the transceiver circuit 46 when the user enters a corresponding instruction on a human-machine interface (for instance a touch screen) of the electronic device 50, e.g. when the user selects a virtual button on the touch screen of the electronic device 50.

As nowadays electronic devices such as smartphones are frequently equipped with communication circuits allowing communications via Bluetooth or in a WLAN, the electronic module 40 makes it possible to easily control operation of the access system 4 using the user's own electronic device 50.

The invention claimed is:

1. An arrangement for controlling a park area access system, comprising:
   a button;
   a first control circuit connected to the button for triggering the operation of the park area access system upon actuation of the button;
   a receiver circuit;
   a controllable switch connected in parallel to the button; and
   a second control circuit for toggling the controllable switch when the receiver circuit receives a wireless instruction,
   wherein the second control circuit toggles the controllable switch in response to a wireless instruction transmitted from an onboard system of a vehicle that comprises an automatic parking unit for controlling a maneuver of the vehicle in the park area.

2. The arrangement according to claim 1, wherein the button is located inside the park area.

3. A process for controlling the park area access system using the arrangement according to claim 1, comprising sending the wireless instruction by a communication circuit.

4. The process according to claim 3, wherein the automatic parking unit includes at least one sensor for acquiring data relating to the vehicle environment, a processing circuit for processing data acquired by the sensor and a control circuit for controlling a vehicle motion control mechanism based on the processed data.

5. The process according to claim 3, wherein an electronic device integrates said communication circuit.

6. The process according to claim 3, wherein the communication circuit establishes a wireless data link with the receiver circuit and transmits said wireless instruction via said wireless data link.

7. The process according to claim 6, wherein the communication circuit sends the wireless instruction synchronously to said maneuver.

8. The process according to claim 7, wherein the automatic parking unit computes an appropriate time for the operation of the access system and wherein the communication circuit transmits the wireless instruction at said appropriate time.

9. An arrangement for controlling a park area access system, comprising:
   a button;
   a first control circuit connected to the button for triggering the operation of the park area access system upon actuation of the button;
   a receiver circuit;
   a controllable switch connected in parallel to the button;
   a second control circuit for toggling the controllable switch when the receiver circuit receives a wireless instruction; and
   a receiver unit connected to the first control circuit and configured to receive a radiofrequency signal,
   wherein the first control circuit is also configured to trigger the operation of the park area access system upon the receiver unit receiving a sub GHz radiofrequency signal.

* * * * *